United States Patent [19]

Lange

[11] 4,386,963

[45] Jun. 7, 1983

[54] GRINDING AIDS FOR GRANULAR BLAST FURNACE SLAG

[75] Inventor: Bruce A. Lange, Hamstead, N.H.

[73] Assignee: W. R. Grace & Co., Cambridge, Mass.

[21] Appl. No.: 304,272

[22] Filed: Sep. 21, 1981

[51] Int. Cl.$^3$ ............................................. C04B 7/14
[52] U.S. Cl. ...................................... 106/117; 241/16
[58] Field of Search .................. 106/102, 117; 241/16

[56] References Cited

U.S. PATENT DOCUMENTS

| | | | |
|---|---|---|---|
| 2,031,621 | 2/1936 | Tucker et al. | 106/90 |
| 2,360,517 | 10/1944 | Scripture | 106/90 |
| 2,588,248 | 3/1952 | Klein | 106/90 |
| 3,068,110 | 12/1962 | Fagerholt | 106/102 |
| 3,329,517 | 7/1967 | Dodson et al. | 106/90 |
| 3,607,326 | 9/1971 | Serafin | 106/102 |

FOREIGN PATENT DOCUMENTS

| | | | |
|---|---|---|---|
| 39-13947 | 7/1964 | Japan | 106/314 |
| 404801 | 3/1974 | U.S.S.R. | 106/90 |

OTHER PUBLICATIONS

Publication of T. Iwabuchi, Effect of Additives on Crushability of Cement Raw Materials, Semento Gijutsu Nempo, 25, (1971), pp. 56–59.

Publication of R. Kondo et al., Slag Powder Base Compact with Carbonation Promoter (Japanese Kokai 77-140536), Chemical Abstracts, vol. 89, (1978), No. 29770z.

Kirk–Othmer, Encyclopedia of Chemical Technology, 2nd Edition, supplement vol., John Wiley & Sons, Inc., New York, 1971, pp. 876–878.

*Primary Examiner*—James Poer
*Attorney, Agent, or Firm*—John J. Wasatonic; William L. Baker

[57] ABSTRACT

Granular blast furnace slag is interground with amine salts of aromatic group-containing carboxylic acids to enhance the efficiency of the grinding operation. In a preferred embodiment, a mixture of aromatic group-containing carboxylic acids obtained as a low cost by-product in a commercial process to produce phthalic anhydride, is utilized to prepare the amine salt grinding aid of the invention.

10 Claims, No Drawings

GRINDING AIDS FOR GRANULAR BLAST FURNACE SLAG

BACKGROUND OF THE INVENTION

This invention relates to grinding blast furnace slag and more particularly to the use of an additive for improving the efficiency of the grinding operation as well as improving characteristics of the ground slag product.

Granular blast furnace slag is produced by air and water quenching of the molten, non-metallic residue remaining after the treatment of metallic ore in a blast furnace in the production of iron and steel. Grinding of such slag, followed by exposure to the proper catalyst such as lime, will produce a product which acts as a cementitious material, but only behaves well as such when ground to a very fine particle size.

The grinding of any solid material to obtain a desired finer particle size involves the consumption often times of a considerable amount of energy by the grinding equipment. It is desirable in this grinding therefore to have as efficient an operation as possible.

It has become customary in grinding products which are used in relatively large volume such as Portland cement to employ chemical "grinding aids". Such grinding aids are added before or during the grinding operation to assist in the grinding operation either by increasing the rate of production, or by increasing the fineness of the cement particles at the same rate of production, without having adverse effects on any of the properties of the ground product. In some instances, the presence of the grinding aid in the finished, ground product will also cause the ground product to exhibit a reduced tendency to compact or to "pack set". The tendency of ground solids to compact or "pack set" is thought to be brought about by cleavage of the particles during grinding of such, which exposes fresh or nascent surfaces which have high energy. Reduction of this tendency to "pack set" or compact is desirable since it facilitates the transportation of the ground product.

Many chemicals and combinations thereof have been suggested for use as grinding aids in the reduction of the particle size of Portland cement clinker and other hydraulic cements, as well as other "minerals". Some examples of grinding aids which have been successfully utilized on a commercial scale in the grinding of Portland cement clinker are phenol, acetic acid, amines and salts thereof, glycols, and combinations of the foregoing. U.S. Pat. No. 3,329,517 to Serafin discloses amine salts of acetic acid as grinding aids for Portland cement. U.S. Pat. No. 3,607,326 to Serafin discloses a grinding aid and pack set inhibitor for Portland cement and other "minerals" which is an amine salt of an aryl hydroxy compound, for example, triethanolammonium phenoxide. This patent also mentions the use of such amine salts as useful in the grinding of phosphate rock, iron ore, bauxite, clay, gypsum, amorphous silica, limestone, beryllium oxide and magnesia. The use of amine salts of alkyl benzene sulphonic acid and the diethanolamine salt of dodecyl benzene sulphonic acid in particular have been suggested as grinding aids for cements (Japanese Pat. Nos. 7421408 and 7421410 to H. Miyairi and M. Nakano). In my copending application U.S. Ser. No. 218,230 filed Dec. 19, 1980, abandoned in favor of continuation application U.S. Ser. No. 367,658, filed Apr. 12, 1982, amine salts described by Serafin in the above U.S. Pat. No. 3,607,326 are disclosed as particularly good grinding aids in the grinding of blast furnace slag. In my copending application U.S. Ser. No. 269,077 filed June 2, 1981, the use of amine salts of aromatic group-containing carboxylic acids are disclosed as effective grinding aids in the grinding of Portland cement clinker.

SUMMARY OF THE INVENTION

The present invention is based upon the discovery that salts formed by reacting aromatic group-containing carboxylic acids with amines are particularly efficient as grinding aids in the grinding of granular blast furnace slag. Such salts moreover offer the advantage that the carboxylic acid reactant is obtainable commercially in many instances from starting materials (benzene, toluene, xylenes, etc.) produced in the distillation of coal, and therefore avoid the price fluctuations and shortages currently characteristic of chemicals derived solely from petroleum.

Most preferred as a grinding aid according to the invention is an aromatic group-containing carboxylic acid amine salt prepared by reacting an amine and an acid component obtained as a by-product in a commercial process to produce phthalic anhydride. The by-product, which is principally a mixture of benzoic acid and phthalic anhydride, is economically available since uses for the by-product material are limited. Moreover, the by-product is obtained from a process which uses naphthalene as a starting material which is obtainable from coal tars.

DETAILED DESCRIPTION

The grinding aids of the invention are prepared by mixing the aromatic group-containing carboxylic acid component and the amine to obtain an essentially neutral amine salt. The starting materials may be pure chemicals or chemical mixtures.

The amines employed in the present invention include primary, secondary and tertiary aliphatic or aromatic amines and preferably alkanolamines, as well as mixtures of such. Useful amines may be represented by the formulae:

and

wherein $R^1$ is hydrogen, an alkyl, alkanol, alkaryl or aryl radical; $R^2$ is hydrogen, alkyl or alkanol radical; $R^3$ is hydrogen, hydroxyl, alkyl, alkanol or aryl radical; $R^4N$ is pyrrolidinyl, pyrrolinyl, pyrrolyl, morpholinyl, piperdinyl, or piperazinyl radical and $R^5$ is hydrogen, alkyl, or alkanol radical. The term "aryl" as used herein is intended to refer to a phenyl or naphthyl radical. One or more of the hydrogen atoms on the aryl radical may be replaced by a substituent group such as a nitro; halogen, preferably chlorine, alkyl, preferably a 1 to 5 carbon group, more preferably methyl; aryl, amino and alkoxy, preferably a 1 to 5 carbon alkoxy group. In addition, pyridazine, pyrimidine and pyridine and such compounds wherein one or more hydrogen atoms are replaced with hydrogen, hydroxy or alkyl radicals are also useful in preparing additives within the scope of the present invention. The terms pyrrolyl, pyrrolydil, morpholinyl and piperadyl, as used herein are intended to include the substituted radicals which are known to the art, e.g., N-methylmorpholine, and 4-(2-aminoethoxy)ethylmorpholine.

A particularly preferred amine component for reacting with the aromatic group-containing carboxylic acid to produce the additives of the invention is a residue product derived from commercial processes to produce alkanolamines such as that described in U.S. Pat. No. 3,329,517 to Dodson. The additive is derived from the residue obtained in preparing ethanolamines. The residue product may be derived from a number of well known methods which are employed to synthesize ethanolamines. It may be obtained from such reactions as the ammonolysis or amination of ethylene oxide, the reduction of nitro alcohols, the reduction of amino aldehydes, ketones and esters, and the reaction of halohydrins with ammonia or amines. The exact composition of the residue product varies within certain limits, and, therefore, the term "ethanolamines" as used herein and in the claims refers to one or more mono-, di-, or triethanolamines, preferably between 40 to 85% by volume triethanolamine. In general the residue product is predominantly triethanolamine. A specific residue product which is employed in a particularly preferred embodiment of this invention is a mixture of mono-, di-, and triethanolamine which is available commercially and has the following chemical and physical properties:

| | |
|---|---|
| Triethanolamine | 45 to 55% by volume |
| Equivalent weight | 129 to 139 |
| Tertiary amine | 6.2 to 7.0 meq./gm. |
| Water | 0.5% by wgt., maximum |
| Density | 9.49 lbs./gal |

The aromatic group-containing carboxylic acids reacted with the amines herein include mono- and polycarboxylic acids having one or more aromatic groups in their molecular structure. The terms "aromatic" and "aryl" as employed herein include the unsaturated cyclic hydrocarbon radicals principally, as exemplified by the phenyl, benzyl, naphthyl, etc., radicals. Such carboxylic acids could have groups (e.g. alkyl-, halo-, nitro-, hydroxy, etc., groups) in addition to, for example located upon, such aromatic or aryl groups so long as such do not deleteriously affect the intended use of the additive compound according to the invention. Illustrative of the aromatic group-containing carboxylic acids useable herein are aromatic carboxylic acids such as benzoic acid, phthalic acid and the alkyl benzene carboxylic acids. Also, aryl-substituted aliphatic acids such as naphthaleneacetic acid and mandelic acid (a-hydroxyphenylacetic acid). Mixtures of such acids may also be used. Moreover, anhydrides of such acids may be used herein but it may be necessary to first convert the anhydride to the acid prior to reaction with the amine component.

A particularly preferred carboxylic acid component for reaction with the amines to produce the additives according to the invention is that obtained from a by-product in commercial processes to produce phthalic anhydride by the oxidation of napthalene, typically in the presence of catalyst, to phthalic anhydride. In the final stages of such processes, the oxidation product is subjected to a distillation step towards recovery of the highly pure anhydride product. A by-product produced from such distillation, sometimes referred to in the industry as "phthalic lites", comprises a mixture of benzoic acid and phthalic anhydride. This by-product because of its impurity has limited usage. Also, its toxicity makes its disposal complicated. It has been found that such by-product, after treatment to convert the phthalic anhydride to the acid, is an ideal material to react with amine to produce the grinding aid additive of the invention. Moreover, the by-product is obtained from a feedstock, naphthalene, obtainable from coal tar, and thus many of the problems associated with chemicals solely dependent upon petroleum for their availability are avoided.

The "phthalic lites" by-product mixture as aforedescribed is principally comprised of a mixture of benzoic acid and phthalic anhydride. The exact proportions of each of such ingredients in the mixture can vary widely, say from 99:1 to 1:99 benzoic acid to anhydride. It has been found desirable to convert the anhydride in the by-product to the acid prior to reaction with the amine to produce the grinding aid of the invention. If the product is not so converted, esters are produced in the reaction with the amine, which leads to products which are less effective as grinding aids.

The preferred method for conversion of the "phthalic lites" by-product mixture is by hydrolysis, hereinafter termed "hydrolyzed phthalic lites". In the preferred procedure, the by-product mixture is heated to a molten condition (e.g. 110° C.) which renders it easily transportable, pumpable, etc., and added to hot water (e.g. about 80° C.) to effect the conversion of the anhydride to phthalic acid. After cooling, the amine reactant is added to produce essentially a mixture of amine salt of benzoic acid and amine salt of phthalic acid.

The term "granular blast furnace slag" as used herein is intended to refer to the solidified and preliminarily crushed (preferably −20 mesh, U.S. Sieve System) mixture of iron ore impurities and fluxing materials resulting from the manufacture of iron and steel in a blast furnace. The chemical composition of typical blast furnace slags from various parts of the world is given in Kirk Othmer's Encyclopedia of Chemical Technology, Second Edition, Supplemented Volume page 877 (1971, John Wiley & Sons, Inc.).

Generally speaking, slags that can be ground in the process of this invention comprise the ingredients shown in Table I.

TABLE I

| Ingredients | Weight Percent | Preferred |
|---|---|---|
| CaO | 35–45 | about 40 |
| $SiO_2$ | 30–40 | about 35 |
| $Al_2O_3$ | 5–20 | about 12 |
| MgO | 3–15 | about 5 |
| Others | balance | balance |

On the same page in the above encyclopedic reference, there is a phase diagram for the $CaO$-$Al_2O_3$-$SiO_2$-$MgO$ system (at least 5% MgO) showing the distinction between blast furnace slag and other materials of the same general system.

The additives of the present invention may be employed in either dry or liquid form. For convenience, the additive may be in water solution to permit accurate metering into the mill stream. The addition is accomplished either prior to the grinding or the additive is introduced into the grinding mill simultaneously with the slag.

The additive of the invention is employed effectively over a relatively wide range. The preferred range is about 0.001 to 1 percent based on the weight of the cement, i.e., the weight of additive solids based on the weight of the cement solids (herein referred to as "solids on solids"). In a particularly preferred embodiment, the amount of additive employed is about 0.004 to 0.04 percent. Higher levels are employed if grinding to a relatively high surface area, and the amount of additive is limited solely by the desired surface area and the degree of fluidity desired.

EXAMPLE I

In experiments to test the efficiency of grinding aids according to the invention in the grinding of granular blast furnace slag, test grinds were made in a laboratory batch mill. In the experiments, 3500 g (sample A) or 3400 g (sample B) of granular blast furnace slag (−20 mesh) were ground along with various percentages (0.02–0.04 percent, solids on solids) of the grinding aids of the invention. For comparison, a "blank" control grind, that is an identical grind of the same amount of slag product without any additive, was also performed. Each grind was identical, that is, the mill was operated the same number of revolutions at 220° F., and the surface area (Blaine Surface Area") of the resulting ground product measured in centimeters squared per gram. The increase in fineness (the increase in "Blaine Surface Area") evidence by the ground test sample containing the grinding aid was calculated as a percent of the surface area measured for the "blank" control. This percentage is recorded as "Percent Improvement Over Blank" in Table I.

For a further comparison, the amine phenolate slag grinding aid described in my copending application U.S. Ser. No. 218,230 filed Dec. 19, 1980, was included in the grinding experiment. The amine phenolate was prepared as in Example I of such copending application U.S. Ser. No. 218,230 using the following procedure.

| Components | Percent By Weight |
|---|---|
| Phenol | 31 |
| Triethanolamine* | 49 |
| Water | 19.5 |
| Chelating Agent | 0.25 |
| Dye | 0.25 |

*"Residue" mixture from ethanolamine synthesis as previously described.

The composition shown above is prepared using the following steps:

1. Combine phenol and 38% of the total required amount of triethanolamine; mix.
2. Add remainder of triethanolamine to step 1 material; mix
3. Mix water, chelating agent and dye in a separate container.
4. Combine step 2 material with step 3 material.

The results of the grinding experiments are set forth in Table I below.

TABLE I

| Slag Sample[a] | Grinding Aid | Addition Rate (% sos) | Percent Improvement Over Blank | | | |
|---|---|---|---|---|---|---|
| | | | Run #1 | Run #2 | Run #3 | Average |
| A | Triethanolamine + Phthalic Acid | 0.04 | 15.6 | — | — | 15.6 |
| A | Amine Phenolate | 0.04 | 15.3 | 14.1 | — | 14.7 |
| A | Triethanolamine + Hydrolyzed Phthalic Lites | 0.04 | 15.1 | 13.2 | — | 14.2 |
| A | Amine Phenolate | 0.04 | 10.9 | — | — | 10.9 |
| A | Triethanolamine + Hydrolyzed Phthalic Lites | 0.02 | 6.1 | — | — | 6.1 |
| A | Amine Phenolate | 0.02 | 6.4 | — | — | 6.4 |
| B | Ethanolamine Residue + Hydrolyzed Phthalic Lites | 0.022 | 5.9 | 5.4 | 6.9 | 6.1 |
| B | Amine Phenolate | 0.022 | 4.0 | 4.6 | 3.0 | 3.9 |
| B | Triethanolamine + Benzoic Acid | 0.022 | 4.6 | 4.0 | 0.6[b] | 4.3 |
| B | Triethanolamine + 2-Naphthaleneacetic acid | 0.022 | 4.2 | 4.8 | 4.6 | 4.5 |

[a]Both samples of slag were received from the same company, Sample A in September of 1979 and Sample B in July of 1981. Contaminating iron particles were removed from Sample A at this laboratory while the supplier performed the decontamination for Sample B. For this reason Sample B is probably more representative of the type of material that the grinding aids of the invention would be used with
[b]This value was not used in determining the average.

EXAMPLE II

An aromatic group containing carboxylic acid mixture was obtained by hydrolysis of a "phthalic-lite" by-product from a commercial process to produce phthalic anhydride, and reacted with a triethanolamine component to form a salt. As described previously, the "phthalic-lite" by-product was essentially a mixture of benzoic acid and phthalic anhydride. The triethanolamine component was a mixture obtained as a residue product of ethanolamine synthesis previously described. Although the first method described below was employed to obtain the amine salt of the hydrolyzed phthalic lite mixture which was subsequently used in the grinding study of Example I, two procedures may be used in the preparation of the amine salt from "hydrolyzed phthalic lites", the method of choice being dictated primarily by the type of processing equipment available. The figures given in this example are based upon a 1000 gram batch although in practice batches as large as 500 lbs. have been prepared using both procedures.

Procedure #1

Step 1: Melt 292 grams of phthalic lites and heat molten material to between 110° and 115° C.

Step 2: Add 20 grams of hot water (93°–100° C.) to the molten phthalic lites with virorous stirring.

Step 3: Monitor the temperature of the reaction mixture. Initially it will climb as the exothermic hydrolysis reaction takes place, then become constant as thermal equilibrium is reached and finally fall after the hydrolysis step reaches completion.

Step 4: Upon completion of the hydrolysis (as indicated by the decrease in reaction mixture temperature) add 448 grams of triethanolamine with moderate stirring.

Step 5: When the reaction mixture temperature falls to below 90° C. add 240 grams of water.

Procedure #2

Step 1: Heat 260 grams of water to between 75° and 100° C.

Step 2: Add 292 grams of molten phthalic lites to the hot water with vigorous stirring. The temperature of the molten material should be between 110° and 115° C.

Step 3: Monitor the temperature of the reaction mixture as in Step 3 of Procedure #1.

Step 4: When the temperature of the reaction mixture falls to 80° C. begin a slow addition of 448 grams of triethanolamine with moderate agitation. The rate of triethanolamine addition should be adjusted so that the temperature of the reaction mixture does not exceed 100° C.

It is claimed:

1. The method which comprises grinding granular blast furnace slag to reduce the particle size thereof in the presence of an additive comprising a salt formed by reacting an amine and an aromatic group-containing carboxylic acid, the amount of said additive present being sufficient to enhance the efficiency of the grinding operation.

2. The method of claim 1 wherein said amount is about 0.001 to 1 percent by weight, based on the weight of the slag.

3. The method of claim 1 wherein said amine is an alkanolamine or mixture containing such.

4. The method of claims 1, 2, or 3 wherein said amine is triethanol amine.

5. The method of claim 1 wherein said acid is phthalic acid.

6. The method of claim 1 wherein said salt is formed by reacting an amine and benzoic acid.

7. The method of claim 1 wherein said salt is formed by reacting an amine and naphthaleneacetic acid.

8. The method of claim 1 wherein said acid comprises a mixture of acids obtained from a by-product from a process to produce phthalic anhydride.

9. The method of claim 8 wherein said by-product comprises a mixture of benzoic acid and phthalic anhydride.

10. The method of claim 9 wherein said by-product mixture is hydrolyzed to convert said anhydride to phthalic acid prior to reaction with said amine.

* * * * *